Oct. 25, 1949.    W. J. SHIELDS    2,486,215
VALVE
Filed June 15, 1945
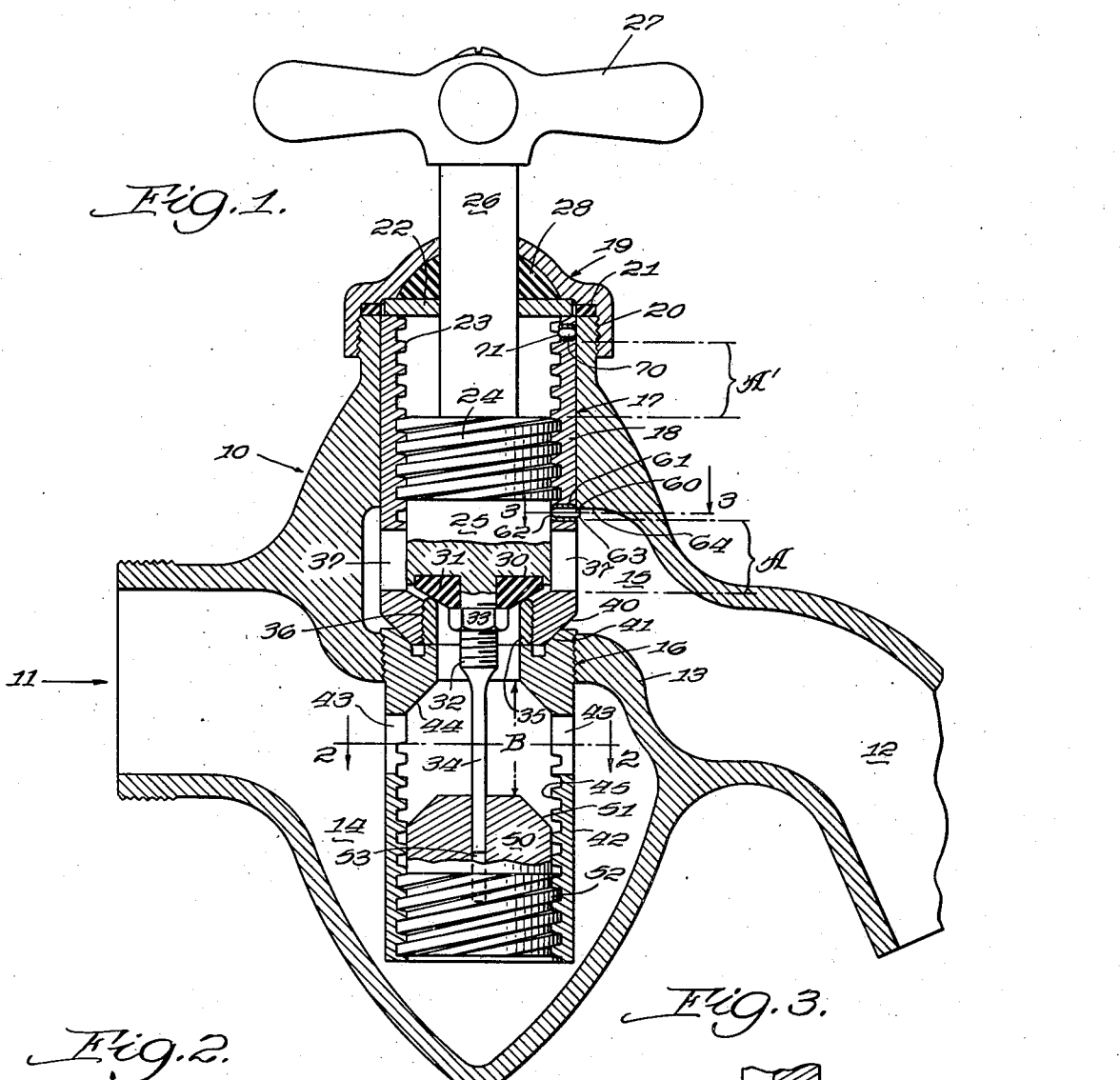
Fig. 1.
Fig. 2.
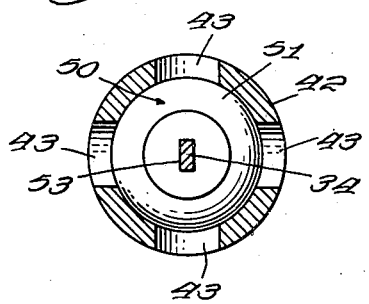
Fig. 3.
Inventor:
Walter J. Shields,
By Stone, Artman & Bisson
Attys.

Patented Oct. 25, 1949

2,486,215

UNITED STATES PATENT OFFICE 2,486,215

VALVE

Walter J. Shields, Chicago, Ill., assignor of one-fourth to Roman R. Stachnik, Chicago, Ill.

Application June 15, 1945, Serial No. 599,702

8 Claims. (Cl. 277—34)

This invention pertains to fluid flow valves and has as its principal object the provision of a combination service and cut-off valve of general application and particularly suited to use in water supply lines and the like in place of ordinary faucets employing replaceable valve faces or washers which must be replaced at intervals, the novel valve being operable to cut off the water flow when operated in a certain manner in order that the main or service valve parts may be removed for replacement of the valve washer without necessitating a shut-off of the water supply at the source.

More particularly, the invention provides a valve of the class described characterized by the provision therein of a main or service valve and a cooperating auxiliary or cut-off valve so contrived that when the service valve is opened to a predetermined extent, the cut-off valve seats and closes, and the service valve parts may be removed at will with positive assurance that the water supply is in effect shut off, it being an important object of the invention to provide for positive coaction between the service and cut-off valves to this end.

Further objects of the invention are: the provision of coacting service and cut-off valve parts operating in such manner that the cut-off valve tends to close upon movement of the service valve toward the position of withdrawal or separation from the valve seat; the provision of means for causing the cut-off valve to move toward closed position concurrently with movement of the service valve toward open position, but at a rate which is faster than the opening movement of the service valve; the provision of jointly moving service and cut-off valves and means coupling the latter with the former for simultaneous displacement at different rates; the provision of means for preventing the removal of the service valve unless the latter has been operated to a position in which the cut-off valve is closed; the provision of a relatively simple, rugged, and practicable construction suitable for manufacture, and in which the parts are readily accessible, positive and reliable in operation, and are contrived to require a minimum of servicing.

Additional objects and aspects of novelty and utility in the invention relate to the construction and operation of the preferred embodiment described hereinafter in view of the annexed drawing in which:

Fig. 1 is a median vertical section through a valve embodying the novel construction;

Fig. 2 is a horizontal section through the cut-off valve, looking in the direction of lines 2—2 of Fig. 1;

Fig. 3 is a magnified sectional fragment of the detent means at line 3—3 of Fig. 1.

The preferred construction of Fig. 1 includes a casting 10 provided with an inlet 11 threaded for coupling with the usual water supply line, there being an outlet spigot 12 on the opposite side of this casting. Interiorly of this casting is a wall 13 dividing the same into a lower chamber 14, which communicates with the inlet, and an upper chamber 15, which communicates with the outlet, there being a threaded opening 16 in said wall adapted to receive a cut-off valve unit.

In the upper portion of the casting 10 there is formed a well 17 adapted to receive a service valve unit consisting of a tubular metal insert 18 received in well 17 and retained in position by a cap nut 19 threaded onto the crown of the casting 10 as at 20, there being a sealing washer 21 interposed between said crown and said cap nut, and in addition a metal end washer 22 clamped against the upper end of the insert by the cap nut.

Upper interior portions of the insert 18 are provided with spiral threading 23 for cooperation with the threaded portion 24 of the service valve plug 25 at the upper part of which is an operating stem 26 projecting through end washer 22 and the crown of cap nut 19, packing 28 being retained between the latter and said washer 22.

The lower end portion of plug 25 is provided with a recess 30 in which is received a usual form of valve washer 31 through which projects a threaded stem 32 from the bottoms of said plug, nut 33 being threaded onto this stem to retain the washer. An annular service valve seat 35 is threaded into a bore, as at 36, in the bottom of insert 18, so that this part of the service valve, like the washer 31, is removable for replacement.

The lower end portion of insert 18 is tapered, as at 40, to seat in a conically recessed portion 41 of a second or cut-off valve insert 42 threadably seated in the opening 16 in wall 13, said insert 42 being bored and communicating at its upper end into the bore of the annular seat 35 to provide for passage of fluid from within the lower insert 42 upwardly past valve part 31, when open, into the bore of the upper insert 18, and thence outwardly of the latter through a plurality of openings 37 for passage to the outlet 12.

Normally, water or other fluid will flow from the inlet 11 into lower chamber 14 and thence through openings 43 in the side walls of insert 42, thence upwardly to and past openings 37, as just described, when the service valve is open. However, when it is desired to effect repairs or replacements in the service valve without shutting off the water supply in the service line, certain manipulation of the service valve will effect closing of a cut-off valve.

The cut-off valve includes a valve plug 50 having a tapered valve face 51 adapted to seat in a complementary conical seat 44 formed interiorly at the upper end of insert 42, the latter being threaded internally as at 45 for cooperation with threading 52 on the cut-off plug, the latter being normally in the lowered position shown in Fig. 1.

Actuation of the cut-off valve is effected by opening rotation of the service valve plug 25 through the agency of a special coupling means between the service plug 25 and the cut-off plug 50 by which a rotary driving motion is communicated to the latter by the former, said means including a flattened coupling stem 34, which is an extension of the threaded stud 32 on plug 25, and which is received slidably in a keyway 53 formed centrally in the cut-off plug 50. Thus, it will appear that when the service plug 25 is rotated, as by turning of handle 27, a like motion is transmitted through the coupling means 34—53 to the cut-off plug 50, so that if the upper, service valve is opening, the lower, cut-off valve is closing.

In order to provide what may be termed a safety feature, the arrangement is such that the cut-off valve plug 50 travels at a faster rate than the service plug 25 when driven by the latter, and to this end, the pitch of the threading 45—52 for the cut-off valve is greater than that afforded by the threading 23—24 for the service plug; preferably, the pitch of the former threading is one and one-half times that of the latter, and this feature, together with certain detent means to be described, assures positive cut-off action of the device, as well as safeguard against careless or accidental dismantling of the service valve before the cut-off valve has closed.

Carried in the sidewall of the upper insert 18 is a locking means in the preferred form of a small detent 60 slidably secured in a shell 61 to be shiftable in a horizontal sense, the construction being magnified in Fig. 3. The inner end 62 of this detent normally bears against the periphery of service plug 25, which causes the opposite or outer end 63 of the detent to project beneath the lower edge of bore 17 in the casting, by reason of which it is impossible to withdraw the insert 18 from bore or well 17 so long as the plug 25 is in lowered blocking position, as shown in Fig. 1. However, if the plug 25 be elevated beyond the end portion 62 of the detent, and a lifting effort applied to the insert 18, the outer end 63 of this detent, being suitably rounded, as in Fig. 3, will cam its way inwardly in the shell away from portion 64 of the casting and free the insert for removal upwardly and outwardly of its seat.

It is important to observe in this connection that whenever the service plug 25 is turned in an opening direction far enough to clear or release the detent 60 as aforesaid, the cut-off plug 50 will have necessarily been turned into closed position by reason of the greater pitch and lead of the threading provided for displacement of the cut-off plug.

A further feature in the nature of registering means for assuring the proper alignment and disposition of the parts in assembling the valve, resides in a second detent 70, substantially identical in construction to the detent 60, situated also in the side wall of the upper insert 18, and having an inner nose portion 71 projecting into the space between adjacent threads 23 to block rotation of the plug 25 beyond this detent 70 until such time as the insert 18 is raised out of its well 17 far enough to permit detent 70 to move outwardly into non-blocking position. Conversely, it is necessary to turn the plug 25 in a closing direction beneath detent 70 in order to reseat the insert 18, while at the same time it is necessary that plug 25 be elevated to a point just below detent 70 in order that detent 60 may be free to permit insertion of the insert and engage detent 60 in locking relation with the casting as at 64, in which condition of the parts, the coupling means 34 is properly registered with plug 50 and keyway 53 to assure intended operation of the two valve means. Therefore, while the insert 18 is out for servicing or replacement of any part associated therewith, should the plug 25 be rotated relatively to such insert and thereby change the relative rotative and axial positions of such insert and plug sufficiently that they are no longer in the proper attitude for reassembly with the insert 42, one or the other of such detents 62 or 70 will be cammed outwardly by the plug 25 to obstruct complete insertion of the insert 18 into the casting 10. The proper adjustment can be attained by rotating the plug so it lies between the detents whereby they are capable of concurrent inward disposal.

In the preferred arrangement shown in Fig. 1, the distance A is equal to the distance A', which represents the distance of travel or displacement of the service valve to free detent 60 and approach detent 70; and the distance B, travelled by the cut-off valve from fully open position to fully closed position is preferably one and one-half times the distance A. The cut-off valve will be fully closed before the upper edge of the threaded portion 24 of plug 25 reaches the upper stopping detent 70, at which time the locking detent 60 will be disengaged or free. In this condition the service valve may be removed; and in this condition it must be replaced, whereby proper registration or disposition of parts is assured.

Since the seating edge 51 of the member 50 approaches its seat 44 pursuant to each opening of the service valve by the movement of the seating portion 31 from its seat 35, it is essential that a considerable spacing of the parts 51 and 44 exists when the parts 31 and 35 are spaced to the extent corresponding to the full open position of the service valve so there will be no throttling of said full opened valve. However, when the service valve is to be removed for repair or the like it is desirable to minimize the additional number of turns necessary to impart to the valve stem 26 for closing the cut-off valve 51—44, and such minimization is attained by increasing the pitch of the threads 45—52 relatively to that of the threads 23—24.

While one preferred form of the invention has been described in specific detail for purposes of illustration and explanation, it should be understood that other embodiments, forms and modifications covered by the spirit and scope of the invention will be readily comprehendible by those skilled in the art.

I claim:

1. In a valve, a valve body for connection in a fluid flow line, an insert removably received in said body, valve means removably received in said insert, registration means cooperatively associated with said insert, said body and said valve means and including a plurality of detents one of which locks said insert in said body cooperatively with said valve means in a predetermined range of movement of the latter in said insert, and another of which is adapted to preclude reception of the insert by said body when the valve is in another range of movement in said insert.

2. In a valve, a valve body for connection in a flow line, an insert removably received in said body, a first valve means adjustable in said insert, a second valve means in said body, coupling means adapted to releasably connect the first and second valve means for concurrent manipulation, said coupling means being released pursuant to removal of the insert and of the first valve means from the body, and registration means associated with said insert and operated by the first valve to preclude removal and insertion of the insert when the adjustment of the first valve means departs predeterminedly from a certain adjustment.

3. In a valve, a valve body providing a housing for valve means, a plurality of cooperating adjustable valve members removably disposed in a predetermined cooperative relationship in said body, and detent means operatively controlled by at least one of said valve members according to its position of adjustment to prevent installation and removal or permit installation and removal of at least one of said valve members from said body.

4. In a valve, a valve body, a valve-receiving insert removably in said body, concentrically-acting spirally-moving valve members respectively in said insert and in said body, coupling means for releasably coupling said valve members while the valve member in the insert occupies a certain axial position therein and while said valve members are in predetermined axial spacing, and movement-limiting means carried by said insert and having components spaced apart in the direction of the axis concentricity of said valve members, one of said components being cooperable with the insert valve member to lock the insert in said body when such valve member departs in one direction from said axial position, and said limiting means further cooperating with the insert valve member to obstruct reception of the insert in the body while such valve member departs in either direction from said axial position in the insert.

5. In a valve, a valve body having inlet and outlet chambers separated by a partition wall having a threaded opening therein, the outlet chamber having an opening within the outer wall thereof in axial alignment with said threaded opening, a shut-off valve structure comprising a tubular member insertable through the outer wall opening into the threaded partition wall opening and with a part of such member in threaded anchorage with the threaded opening while a portion of such member projects into the inlet chamber, said tubular member having an axial passage through the part in the threaded opening for communication between said chambers, a shut-off valve seat at the upstream end of said passage, means for providing communication between the inlet chamber and the upstream end of said passage, a shut-off valve member in threaded relation with the interior of the tubular member and rotatable therein for engagement with said seat for preventing discharge of liquid through said passage, and a service valve structure comprising an insert removably disposed within said outer wall opening, and a service valve member in threaded relation with the interior periphery of said insert to facilitate the movement of said valve member to and from a position for closing the opposite end of said passage, and means detachably interconnecting said valve members for causing concurrent rotation thereof, and the threaded connections of said valve members being such that the shut-off valve member is advanced into closing relation when the service valve is removed an abnormal distance from the passage.

6. The combination set forth in claim 5 wherein said tubular member and said insert have complementally fitting end portions providing a seal between such member and insert, and wherein said insert carries an annular valve seat member disposed coaxially with the passage of the tubular member and cooperable with the service valve member.

7. The combination set forth in claim 5, wherein the tubular member has inner and outer concentric seat portions on its end facing the outlet chamber, wherein the insert has a portion disposed in sealing relation with the outer of said concentric portions, and wherein there is an annular valve seat member cooperable at one end with the service valve member and pressable by the service valve structure against and in sealing relation with the inner of said concentric seat portions.

8. In a valve, a valve body having inlet and outlet chambers separated by a partition wall having a threaded opening therein, the outlet chamber having an opening within the outer wall thereof in axial alignment with said threaded opening, a shut-off valve structure comprising a tubular member insertable through the outer wall opening into the threaded partition wall opening and with a part of such member in threaded anchorage with the threaded opening while a portion of such member projects into the inlet chamber, said tubular member having an axial passage through the part in the threaded opening for communication between said chambers, a shut-off valve seat at the upstream end of said passage, means for providing communication between the inlet chamber and the upstream end of said passage, a shut-off valve member in the tubular member and cooperable with said seat, a service valve structure comprising an insert insertable through said outer wall opening and abuttable against an end of said tubular member to form a sealed connection therewith, a valve member adjustably coaxially in the insert to and from a position for closing the downstream side of the passage in said tubular member, and means releasably interconnecting said valve members for causing placement of the shut-off member against its seat when the service valve member is displaced abnormally from its closing position.

WALTER J. SHIELDS.

REFERENCES CITED

The following references are of record in the file of this patent:

UNITED STATES PATENTS

| Number | Name | Date |
| --- | --- | --- |
| 1,168,262 | Browser | Jan. 11, 1916 |

FOREIGN PATENTS

| Number | Country | Date |
| --- | --- | --- |
| 17,720 | Great Britain | Dec. 18, 1915 |
| 170,649 | Great Britain | Oct. 24, 1921 |